United States Patent Office 3,410,164
Patented Nov. 12, 1968

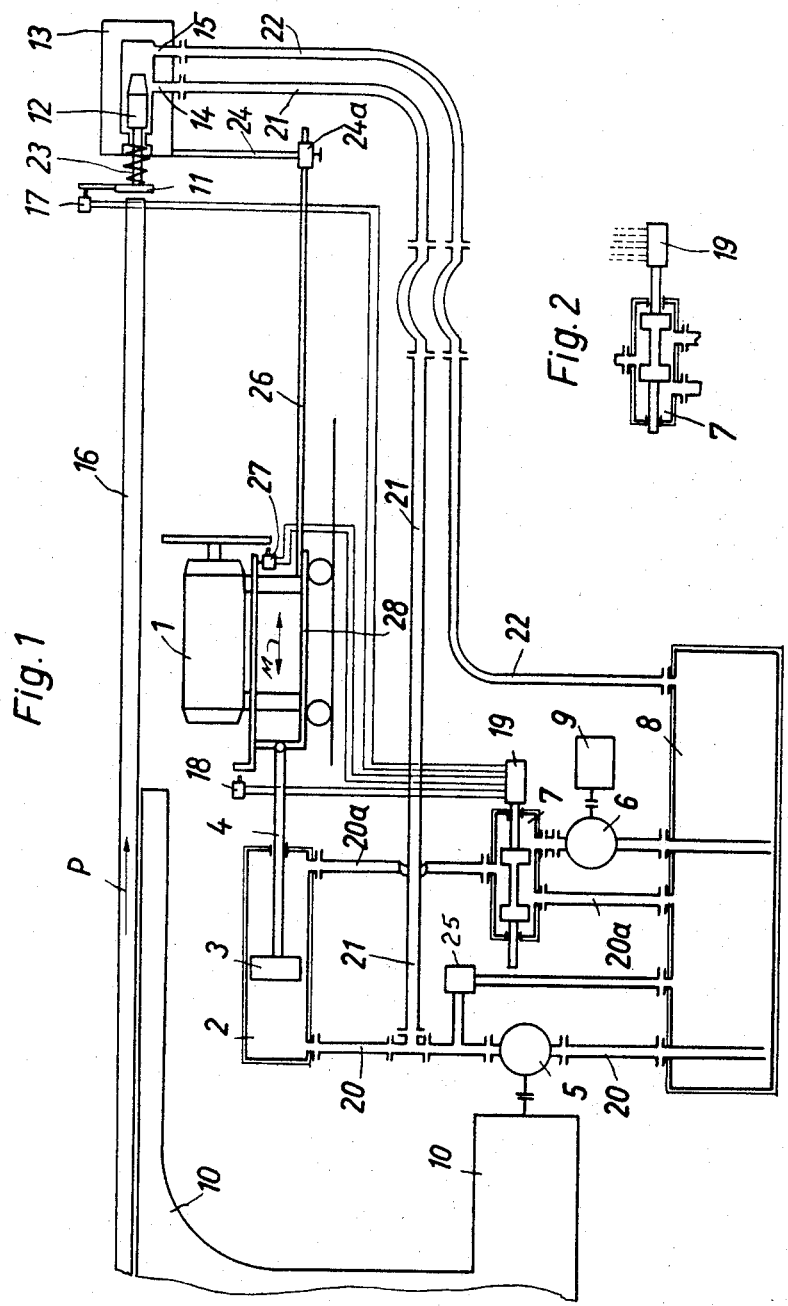

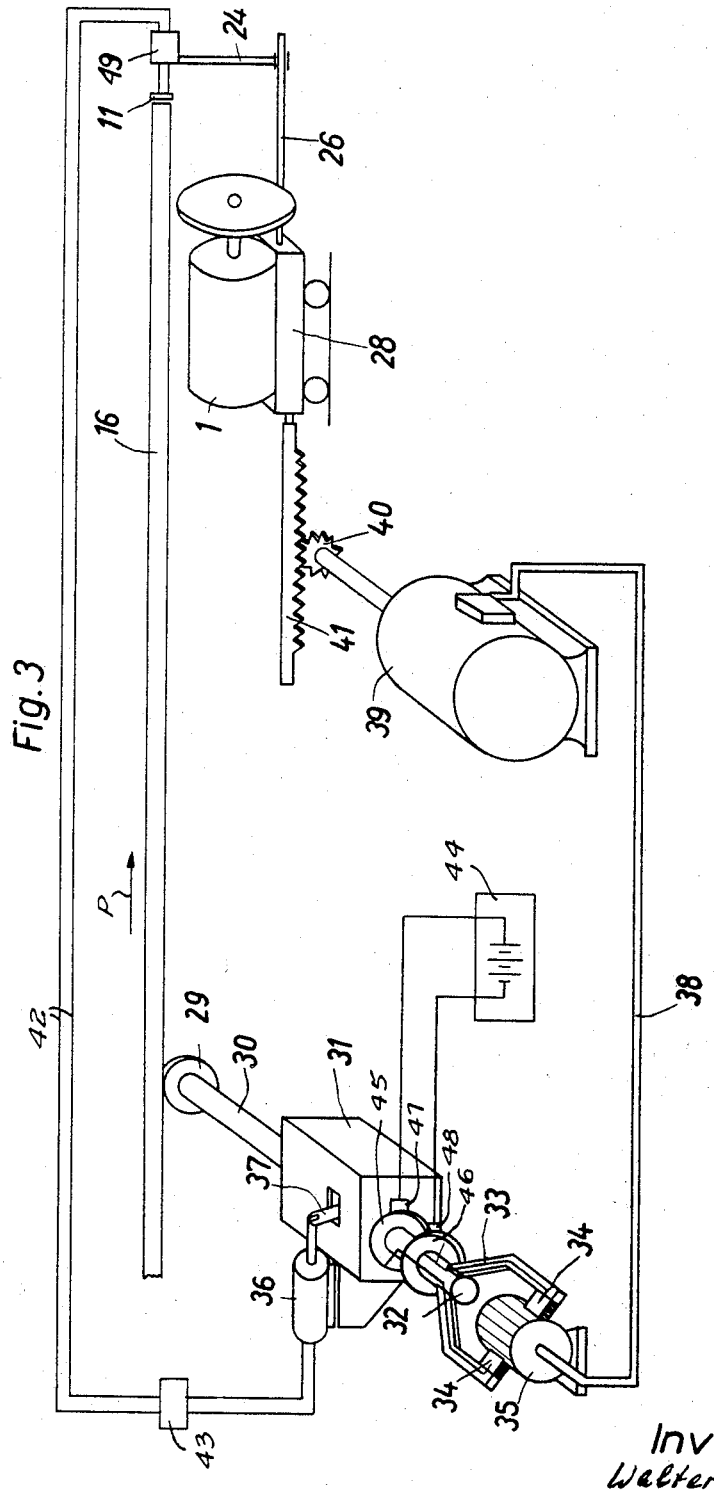

3,410,164
AUTOMATIC MOVEMENT CONTROL SYSTEM FOR A WORK DEVICE FOR A WORKPIECE
Walter Schlüter, Geesthacht, Germany, assignor to Wilhelmsburger Maschinenfabrik Hinrichs & Sohn, Geesthacht, Germany
Filed May 25, 1965, Ser. No. 458,684
Claims priority, application Germany, May 25, 1964,
W 36,858
11 Claims. (Cl. 83—290)

The present invention relates to an automatic movement control system for a work device for a workpiece. More particularly, the invention relates to an automatic movement control system for moving at a controlled rate a work device such as, for example, a cutter, saw, marker, punch, or the like, for a workpiece such as, for example, a milled, contoured, shaped, bent object, article member, or the like, produced by a milling, contouring, shaping, bending machine, or the like.

In a system of the type of the present invention, the machined member or workpiece is cut, marked, separated or otherwise sub-divided by the work device as it leaves the machine which has formed, shaped or otherwise worked it. The work device must move from a standstill or rest condition to a speed corresponding to that at which the workpiece is fed from the machine in order to enable said work device to cut, punch or mark the workpiece into uniform lengths while the workpiece continues to move, without stopping the machine.

A carriage is moved parallel to the direction of movement of the workpiece and supports the work device. The speed of the carriage is accelerated to the speed of movement of the workpiece and is initiated by a contact abutted by the workpiece. Since the speed of movement of the workpiece corresponds to the speed of operation of the forming or shaping machine or the like, the movement control system must bring the work device to the speed of operation of the machine at the proper time with rapidity and without impact or excessive stress or strain. This enables the work device to sever, punch, score or mark the continuously moving workpiece.

In order for the workpiece to be properly cut or marked, the movement control system must suitably move the carriage which supports the work device and must cause the contact abutted by the workpiece to suitably control the control medium such as, for example, hydraulic fluid or electricity, of the control system.

In movement control systems of known type, a power driven pump for a hydraulic fluid always produces a uniform pressure at a uniform output, so that the carriage which supports the work device can be moved at the desired speed only when the pressure of the hydraulic fluid is correspondingly controlled. The known movement control systems are thus unsatisfactory in operation. Although the pressure of the hydraulic fluid may be controlled by flow regulation, such regulation is not sufficiently accurate due to the different speeds of operation of the shaping machine or the like and due to the variation of the viscosity of the hydraulic fluid with temperature.

The principal object of the present invention is to provide a new and improved automatic movement control system for a work device for a workpiece.

An object of the present invention is to provide an automatic movement control system for a work device for a workpiece which is effective, efficient and reliable in operation.

Another object of the present invention is to provide an automatic movement control system for a work device for a workpiece which overcomes the disadvantage of known systems and provides accurate control of the system control medium.

In accordance with the present invention, an automatic movement control system for a work device for a workpiece comprises a drive for driving the carriage which supports the work device in dependence upon the speed of operation of the shaping or forming machine. The control medium of the movement control system of the present invention may be hydraulic fluid, in which case the control part of a hydraulic pump is directly coupled to the drive of the machine which produces the workpiece, or it may be electricity, in which case an electric carriage-driving motor is energized in accordance with the speed of movement of the workpiece.

In order that the present invention may be readily carried into effect, it will now be described with reference to the accompanying drawings, wherein:

FIG. 1 is a schematic hydraulic circuit diagram of an embodiment of the automatic movement control system of the present invention;

FIG. 2 is a view of a portion of FIG. 1; and

FIG. 3 is a schematic diagram, partly mechanical and partly electrical, of another embodiment of the automatic movement control system of the present invention.

In the figures, the same components are indicated by the same reference numerals.

In FIG. 1, a shaping, forming, milling, contouring, bending, or the like, machine 10 produces or shapes, forms, mills, contours, bends, or otherwise effects a machined member or workpiece 16. The machine 10 operates at a selected operating speed and supplies or turns out the workpiece 16 at a speed which corresponds to such operating speed. The workpiece 16 moves continuously in the direction of an arrow P.

The end of the workpiece 16 farthest from the machine 10 abuts a contact or stop 11 and moves said contact, against the face of a spring 23 which is positioned on the stem of said contact, in the direction of the arrow P. A hydraulic slide valve 12 is affixed to and moves with the stem of the contact 11 in a hydraulic slide valve casing or housing 13. Ports 14 and 15 are formed through the wall of the valve casing 13. A flexible conduit, pipe, tube or the like 21 connects the port 14 of the valve housing 13 to a reservoir or source of hydraulic fluid in a fluid container, cylinder, tank or the like 8 via a hydraulic pump 5 and a conduit 20. A flexible conduit, pipe, tube or the like 22 connects the port 15 of the valve housing 13 to the fluid container 8 directly.

A work device 1 may comprise a saw, torch, rasp, file, knife-blade, cutter, punch, marker, or the like, tool or device for cutting, separating, marking, or otherwise working on or sub-dividing the workpiece 16. The work device 1 is supported on a carriage 28 to move in directions parallel to the direction of movement of the workpiece 16, as indicated by a two-headed arrow M. A connecting rod 26 is affixed to the carriage 28 and extends in the direction of the arrow P. A link rod 24 is supported by the connected rod 26 in a manner in which said link rod may be moved in either direction of the arrow M along said connecting rod before the said link rod is tightened in position. The link rod 24 is thus adjustable in axial position on the connecting rod 26 although said link rod maintains a substantailly perpendicular relationship with said connecting rod.

The valve housing 13 is supported by the link rod 24 at its end opposite that which is supported by the connecting rod 26 and in a position in which the contact 11 is readily abutted and moved in the direction of the arrow P by the workpiece 16. The carriage 28, and thus the work device 1, are driven by hydraulic fluid from the container 8 via the conduit 20, the hydraulic pump 5 and a hydraulic cylinder 2. A piston 3 in the hydraulic cylinder 2 has a piston rod 4 affixed to it at one end and said piston rod is affixed at its other end to the carriage 28. The hydraulic cylinder 2 has ports formed through the wall thereof. A conduit 20a connects one of the ports of the hydraulic cylinder 2 to the container 8 via a hydraulic valve 7 and a hydraulic pump 6, whereas the other of the ports of said hydraulic cylinder is connected to said container via the conduit 20 and the hydraulic pump 5. The carriage 28 is driven in either direction of the arrow M.

In accordance with the present invention, the control port of the hydraulic pump 5 is directly coupled to the drive of the machine 10 or to a part or parts of said machine which move at the speed of operation of the said machine. The hydraulic pump 5 continuously supplies hydraulic fluid from the container 8 via the conduit 20 at a rate which corresponds to the speed of operation of the machine 10. When the workpiece 16 is not yet in abutment with the contact 11, and the hydraulic valve 12 is in its position shown in FIG. 1, in which it leaves both ports 14 and 15 unblocked, hydraulic fluid is pumped without effect by the hydraulic pump 5 through the hydraulic circuit comprising the container 8, the conduit 20, the conduit 21, the port 14, the valve housing 13, the port 15 and the conduit 22 back to said container. This path of the hydraulic fluid results from the condition that the piston 3 and carriage 28 together with all of the mechanical members secured to it, offer greater resistance to the hydraulic fluid that the free and unobstructed path through conduit 21, open ports 14 and 15, and conduit 22.

When the workpiece 16 abuts the contact 11 and moves the hydraulic valve 12 in the direction of the arrow P to block the port 14, the hydraulic circuit is short-circuited at the end of the conduit 21 adjacent said port. This blockage of the conduit 21 at the port 14 prevents the flow of hydraulic fluid through the conduit 22 and thus causes the hydraulic fluid to flow through the conduit 20 into the hydraulic cylinder 2 to move the piston 3, and thus the carriage 28 and the work device 1, to the right in the direction of the arrow P. The carriage 28 moves the contact 11 with it in the direction of the arrow P due to the connecting rod 26 and the link rod 24, until the work device 1 has completed its operation on the workpiece 16 of cutting, or the like.

The amount of hydraulic fluid initially pumped by the hydraulic pump 5 is adjusted to correspond to the speed of operation of the machine 10, so that the maximum volume or pressure of hydraulic fluid moves the work device 1, via the carriage 28, in the direction of the arrow P at said speed of operation of said machine, which corresponds to the speed of operation of the workpiece 16. Since the operation of the hydraulic pump 5 and the speed of operation of the machine 10 are controlled by the drive device of said machine, because the control part of said hydraulic pump is coupled by any suitable coupling means such as, for example, a mechanical linkage, to the machine drive or to a device rotating at the speed of operation of the machine, the work device 1 moves at the speed of movement of the workpiece 16, not faster and not slower.

The length of each portion cut from the workpiece 16 is determined due to the adjustability in position of the contact 11 as a result of the axially adjustable mounting of the link rod 24 on the connecting rod 26. Due to such positioning of the contact 11 relative to the work device 1, there is sufficient time provided for the completion of the cutting or the like operation on the workpiece 16 by the work device 1, the work device being in the determined operating position at the determined time. The contact or stop 11 is moved into abutment with the valve housing 13 by the workpiece 16 at the instant that the hydraulic valve 12 blocks the port 14. This provides movement of the workpiece 16 and the work device 1 and operation of the machine 10 which is rapid and which is devoid of impact or excessive stress or strain and provides severed workpiece portions which are accurately uniform in length. Furthermore, the moving of the contact 11 into abutment with the valve housing 13 at the instant that the hydraulic valve 12 blocks the port 14 prevents abrupt acceleration of the carriage 28 which supports the work device 1 and which is a structural component of substantial mass.

The carriage 28, and thus the work device 1 supported by said carriage, are returned to their initial position, after operation of said work device on the workpiece 16 by a contact 17 on the stop 11 and a contact 27 on said carriage. When the work device 1 has operated on the workpiece 16 to cut or otherwise effect said workpiece, the severed portion of said workpiece falls into or is moved into a suitable removing device which is moved synchronously with the work device 1 and which may comprise, for example, a suitable trough or receptacle having a suitable ejection or jettison device (not shown in the figures). The removing device and ejection device may be stationarily affixed to the machine but it is preferable that such devices be synchronously moved with the carriage 28 to avoid narrowly limiting the range within which the severed workpiece portion will fall into the removing device.

When the severed workpiece portion falls into the removing device, it abuts the contact 17 and thereby closes an electrical circuit to energize an electromagnet and electrical energizing source 19 which operates the three-way hydraulic valve 7 in a manner which permits hydraulic fluid to flow from the container 8 to the hydraulic cylinder 2 and in which the pressure of hydraulic fluid admitted to the hydraulic cylinder 2 via the conduit 20a is greater than that of the fluid admitted via the conduit 20 so that the piston 3, and thus the carriage 28 and work device 1, are moved in the direction opposite to that of the arrow P.

The hydraulic fluid for returning the carriage 28 and the work device 1 to their initial position is supplied to the hydraulic cylinder 2 by the hydraulic pump 5 which is operated by any suitable control arrangement 9 such as, for example, an electric motor which may be manually energized or automatically energized upon actuation or energization of the electromagnet 19 or which may be, as is preferable, continuously operating. When the carriage 28 is back in its initial position, it abuts a contact 18 and thereby closes an electrical circuit to deenergize the electromagnet and its electrical energizing source 19 or to energize said electromagnet so that it moves the hydraulic valve 7 back to the position, shown in FIG. 1, in which it prevents the flow of hydraulic fluid to the hydraulic cylinder 2.

A safety valve 25 may be provided to protect the hydraulic pump 5 from being overloaded. The control part of the hydraulic pump 5 may be coupled to a roller engaged by and rotated by the workpiece 16 instead of being coupled to the machine 10, since said workpiece is moved at the speed of operation of said machine and said pump would thus be driven in dependence upon said machine, at the speed of operation of said machine. Furthermore, the hydraulic cylinder 2 may be replaced by a hydraulic motor.

FIG. 3 illustrates another embodiment of the automatic movement control system of the present invention. In the embodiment of FIG. 3, the control medium is electricity. In FIG. 3, the workpiece 16 engages and rotates a drive roller 29 which rotates the drive gear of a gear arrangement in a gear box 31 via a shaft 30. The gear arrangement in the gear box 31 may be shifted, coupled and uncoupled by a control or shaft lever 37 which is controlled in position by a gear control unit 36 which is electrically or mechanically operated by an electrical circuit 42 which is closed by the contact 11 or by a mechanical linkage which is moved by means of said contact. The linkage between the contact 11 and the gear control unit 36 may also be hydraulic or pneumatic. The electrical circuit 42 includes a source of electrical energy 43 such as, for example, a battery, or may be merely connecting lines to a source of electrical energy 44 which may comprise, for example, a battery.

The source of electrical energy 44 is electrically connected to a line 38 via brushes 47 and 48, slip rings 45 and 46 which are driven by the driven gear of the gear arrangement of the gear box 31, said slip rings being mounted on a shaft 32, arms 33, brushes 34 and a commutator 35. The brushes 34 and 47 and 48 may comprise any suitable electrically conductive brushes such as, for example, carbon brushes. The line 38 is an electrical conductor which is connected to an electric motor 39, so that the source of electrical energy 44 may energize said motor via the aforedescribed electrical connections between said source and said line.

When the contact 11 is free and is not abutted by the workpiece 16, the control lever 37 of the gear box 31 is in its initial position in which it disengages the gears of the gear arrangement of said gear box. The shaft 32 is thus stationary and the motor 39 is at rest. A slide housing 49 is adapted to receive the stem of the contact 11 and may comprise any suitable means for providing more movement of the control lever 37 via the gear control unit 36 as said stem moves further into said housing in the direction of the arrow P. A suitable device of such type may comprise, for example, a resistor which is electrically contacted by the stem of the contact 11 and which is gradually cut out of the circuit as said stem moves into the slide housing 49 in the direction of the arrow P.

The workpiece 16 abuts the contact 11 after it has moved a determined distance in the direction of the arrow P. When the workpiece 16 abuts the contact 11, said contact closes the circuit 42 to operate the gear control unit 36 to operate the control lever 37 of the gear box 31. When the stem of the contact 11 is moved in the direction of the arrow P by the workpiece 16 into the slide housing 49, the control lever 37 shifts the gear arrangement of the gear box 31 into coupling engagement. The farther the stem of the contact 11 is moved into the slide housing 49, the greater the voltage applied to the gear control unit 36 and the greater the engaging movement of the control lever 37. Thus, the farther the contact 11 stem is moved into the slide housing 49 in the direction of the arrow P, the more rapidly the shaft 32 is rotated and the more rapidly the motor 39 is driven or rotated. Thus the gear box 31 corresponds to the commonly-known variable speed transmission drives such as a Reeves drive known in the art.

The motor 39 is coupled to and drives a pinion 40 which in turn drives a rack 41 in the direction of the arrow P. The rack 41 is affixed to the carriage 28, so that movement of said rack 41 in the direction of the arrow P moves said carriage in the direction of said arrow. The remainder of the operation is the same as that of the embodiment of FIG. 1, as far as the severing of a portion of the workpiece 16 is concerned; the carriage 28, and thus the work device 1 supported thereon, being returned to its initial position by any suitable arrangement not shown in FIG. 3. Thus, for example, a second motor may be utilized to return the carriage 28 and work device 1 to initial position after operation of said work device on the workpiece 16.

The armature of the motor 39 is provided with fixed pole shoes so that its field rotates at a speed corresponding to the rotary speed of the brushes 34. The rotary speed of the brushes 34 thus determines the working speed of the motor 39. When the stem of the contact 11 is completely in the slide housing 49, the driven shaft 32 rotates at substantially the rotary speed of the drive shaft 30. When the stem of the contact is completely in the slide housing 49, the motor 39, and thus the carriage 28 and the work device 1, are moved at a speed which corresponds to the speed of movement of the workpiece 16.

While the invention has been described by means of a specific example and in specific embodiments, I do not wish to be limited thereto, for obvious modifications will occur to those skilled in the art without departing from the spirit and scope of the invention.

What I claim is:

1. In an automatic movement control system, a machine member driving a work member at a predetermined speed and along a predetermined path;
   a work device disposed adjacent to said work member for operating on said work member to change the characteristic thereof;
   carriage means for supporting said work device and moving the latter along said work member;
   driving means connected to said carriage means for driving same;
   operating means coupled to one of said members and to said driving means, said operating means being actuated by said machine member to operate said driving means directly at the same speed of said machine member and work member;
   actuating means located within said path of said work member and supported by said carriage means, said actuating means being movable with said carriage means and actuatable by said work member;
   and connecting means connecting said actuating means with said operating means for accelerating said carriage to said speed of said work member when latter engages said actuating member and for maintaining the speed of said carriage identical with said work member, said actuating means moving with said carriage means so as to maintain said actuating means engaged with said work member.

2. In an automatic movement control system as claimed in claim 1, said operating means comprising a hydraulic cylinder and piston, said piston being coupled to said carriage means for actuating same, and hydraulic actuating means associated with said hydraulic cylinder for actuating said piston and said carriage means thereby, said hydraulic actuating means being connected and actuated by said machine member.

3. In an automatic movement control system for a work device for a workpiece supplied by a machine in a determined direction at a speed corresponding to the speed of operation of said machine, said machine being driven by machine drive means, hydraulic drive means directly coupled to said machine drive means and to said work device for driving said work device at substantially the speed of operation of said machine, said hydraulic drive means comprising a source of hydraulic fluid, a hydraulic cylinder having a piston and a piston rod affixed to said work device, hydraulic conduit means for supplying hydraulic fluid from said source of hydraulic fluid, a hydraulic pump connected in said hydraulic conduit means for pumping said hydraulic fluid from said source of hydraulic fluid to said hydraulic cylinder, said hydraulic pump having a control part directly coupled to said machine drive means and said hydraulic conduit means being connected to said hydraulic cylinder in a manner whereby said hydraulic pump pumps hydraulic fluid to one side of said piston to move said piston rod and said work device in said determined direction, and an additional hydraulic pump connected in said hydraulic conduit means for pumping said hydraulic fluid from said source of hydraulic fluid to said hydraulic cylinder, said hydraulic conduit means being connected to said hydraulic cylinder in a manner whereby said additional hydraulic pump pumps fluid to the opposite side of said piston to move said piston rod and said work device in a direction opposite to said determined direction, hydraulic valve means connected in said hydraulic conduit means between said additional pump and said hydraulic cylinder, and actuating means coupled to said hydraulic valve means and operated upon the movement of said workpiece to a determined distance from said machine for operating said hydraulic valve means to permit the flow of hydraulic fluid pumped by said additional hydraulic pump to said hydraulic cylinder.

4. In an automatic movement control system as claimed in claim 3, said actuating means comprising electrical drive means coupled to said hydraulic valve means for operating said hydraulic valve means and contact means electrically connected to said electrical drive means for energizing said electrical drive means, said contact means being positioned in a manner whereby they are at said determined distance from said machine at a determined time.

5. In an automatic movement control system for a work device for a workpiece supplied by a machine in a determined direction at a speed corresponding to the speed of operation of said machine, electrical drive means controlled in accordance with the speed of movement of said workpiece and coupled to said work device for driving said work device at substantially the speed of movement of said workpiece, said electrical drive means comprising an electric motor coupled to said work device for driving said work device and control means for supplying electrical energy to said motor to operate said motor as a function of the distance of said workpiece from said machine.

6. In an automatic movement control system for a work device for a workpiece supplied by a machine in a determined direction at a speed corresponding to the speed of operation of said machine, electrical drive means controlled in accordance with the speed of movement of said workpiece and coupled to said work device for driving said work device at substantially the speed of movement of said workpiece, said electrical drive means comprising an electric motor coupled to said work device for driving said work device and control means for supplying electrical energy to said motor to operate said motor at gradually increasing speed in accordance with the distance of said workpiece from said machine.

7. In an automatic movement control system as claimed in claim 6, said control means comprising a source of electrical energy, rotatable electrical connecting means electrically connected between said source of electrical energy and said electric motor and controlled gear means for varying the speed of application of electrical energy from said source of electrical energy to said electric motor.

8. In an automatic movement control system as claimed in claim 7, said controlled gear means comprising drive gear means driven at the speed of movement of said workpiece, driven gear means coupled to said rotatable electrical connecting means and gear coupling control means for coupling said drive gear means to said driven gear means to a degree determined by the distance of said workpiece from said machine thereby varying the speed of application of electrical energy from said source of electrical energy to said electric motor.

9. In an automatic movement control system as claimed in claim 8, said electric motor having an armature with pole shoes fixed in position in a manner whereby the field thereof rotates in accordance with the rotary speed of said rotatable electrical connecting means.

10. In an automatic movement control system as claimed in claim 9, contact means connected to said coupling control means for operating said coupling control means, said contact means being positioned in a manner whereby they are at said determined distance from said machine at a determined time.

11. In an automatic movement control system as claimed in claim 9, electrical contact means electrically connected to said coupling control means for electrically operating said coupling control means, said contact means being positioned in a manner whereby they are at said determined distance from said machine at a determined time.

References Cited
UNITED STATES PATENTS

| | | | |
|---|---|---|---|
| 2,578,825 | 12/1951 | Mirfield et al. | 83—318 X |
| 3,178,974 | 4/1965 | Roess | 83—292 X |
| 3,175,381 | 3/1965 | Hawkins et al. | 83—295 X |

ANDREW R. JUHASZ, *Primary Examiner.*